Patented Apr. 18, 1950

2,504,935

UNITED STATES PATENT OFFICE 2,504,935

COPPER BASE ALLOY AND CONDUCTOR AND MANUFACTURE THEREOF

Alan Morris, Nichols, Conn., assignor to Bridgeport Brass Company, Bridgeport, Conn., a corporation of Connecticut No Drawing. Application November 14, 1945, Serial No. 628,657

7 Claims. (Cl. 75—153)

This invention relates to alloys and particularly to copper base alloys. This invention relates especially to copper base alloys suitable for electric current conductors.

It is a purpose of this invention to provide a copper base alloy having a better combination of tensile strength and electrical conductivity than alloys heretofore commercially available, for use as electrical transmission lines and other purposes where high tensile strength is required in combination with high electrical conductivity.

Pure copper is an excellent conductor of electricity but is deficient in the tensile strength that is required for many commercial applications. A number of proposals have been made for increasing the tensile strength of copper by alloying therewith small amounts of certain metals such as tin, cadmium or the like, and while the tensile strength of pure copper has been improved to varying degrees by so doing, the electrical conductivity has been reduced markedly and to varying degrees. Because of results obtained by use of such alloys, the specifications for copper base alloys for electrical transmission lines, trolley wires and the like ordinarily require a minimum tensile strength in the neighborhood of 72,000 to 76,000 pounds per square inch for a minimum electrical conductivity of 55%. These minimum values for combined tensile strength and electrical conductivity have been selected due to lack of availability of copper base alloys having substantially higher values for the combined properties mentioned. High tensile strength combined with high conductivity is, of course, much to be desired, since for a given current-carrying capacity, the weight and cost of the conductor (and conductor supports in the case of transmission lines and the like) can be reduced to the extent that the tensile strength is increased. In order to increase the tensile strength of electrical conductors, composite transmission wires have been made using a steel wire to carry most of the mechanical load and a conductor such as aluminum or copper to carry the electric current, but while high tensile strength can be obtained in this way, e. g., of the order of 100,000 pounds per square inch, the per cent. conductivity is poor, namely, only about 30% of the conductivity of copper for a given cross-section.

According to this invention, electrical conductors such as wires, strips, etc., can be made which have high tensile strength and high electrical conductivity, the reference being to the high values of these properties in combination. Thus, according to preferred embodiments of this invention, one can readily obtain electrical conductors having a tensile strength of at least 90,000 pounds per square inch and a per cent. conductivity of at least 60 to 65%.

When reference is made herein or in the claims to per cent. conductivity, the reference is to the percentage of electrical conductivity as compared with pure copper, the conductivity being measured by means of the Kelvin or Hoopes bridge on the basis of comparison with the International Standard for Annealed Copper. The tensile strength referred to herein and in the claims is determined by the A. S. T. M. designation E8-42.

Features of this invention relate to the composition of the copper base alloy and conductors composed thereof, while other features of this invention relate to the method of manufacture of electrical conductors from the alloy.

According to this invention, electrical conductors having high tensile strength and high electrical conductivity are produced from a copper base alloy consisting essentially of small amounts of iron and cadmium, the balance being copper. The iron that is present may vary between 0.3% and 5% by weight, and preferably constitutes about 1.5% to about 2.25% by weight of the alloy. The cadmium that is present may vary from 0.4% to 1.2 % by weight, and preferably constitutes about 0.8% to about 1.0% by weight of the alloy. An alloy consisting of 2% by weight of iron, 1% by weight of cadmium, and 97% by weight of copper is typical of preferred practice of this invention. It is desirable in the practice of this invention that the combined weight of iron and cadmium in the alloy be at least 1.5% and preferably at least 2%.

Features relating to the method of producing the alloy and conductors composed thereof relate to combination of mechanical working steps and heating steps whereby high values for combined electrical conductivity and tensile strength are obtained.

In the manufacture of an electrical conductor member, the preferred procedure according to this invention is to subject the alloy to hot working as by hot rolling a cast billet to convenient size. The alloy is then cold drawn and thereafter is annealed at a low temperature to effect an increase in the electrical conductivity of the alloy. Finally, the alloy is cold worked, as by drawing, to finished size.

The initial preparation of the alloy can be accomplished in different ways. The copper is usually melted under charcoal, although other flux covers can be used. The iron can be introduced as metallic iron in the form of chips or strips or as a premelted hardener such as an alloy consisting of 90% by weight of copper and 10% by weight of iron. The cadmium can be added as metallic cadmium or as a premelted alloy of copper and cadmium such as an alloy consisting of 50% by weight of copper and 50% by weight of cadmium. Since there is some loss of cadmium due to volatilization in the initial preparation of the alloy, a slight excess of cadmium is introduced so that the alloy as prepared will contain the predetermined desired cadmium content.

The following is a specific example of the manufacture of an electrical conductor embodying and according to this invention. The alloy is initially prepared so as to contain 2% by weight of iron, 1% by weight of cadmium, and 97% by weight of copper. The alloy is cast to form a billet in the usual manner, the cadmium and iron being in essentially complete solution of the copper. The billet is then subjected to hot rolling, the hot rolling operation being instituted when the billet is at a temperature of about 815° C. and being rolled round to a diameter of about .633 inch. After the hot rolling step, the alloy is then drawn 40% while cold (at a temperature of about 25° C.). The alloy is next annealed at about 460° C. for 4½ hours, and lastly is cold drawn about 50% to desired finished size. The electrical conductor produced as above described has a tensile strength of 90,000 pounds per square inch and 65.5 per cent conductivity. If the alloy is cold drawn after the annealing step to 70% reduction in area, the finished conductor has a tensile strength of 94,000 pounds per square inch and a conductivity of about 63 per cent.

The production of electrical conductors according to this invention can, of course, be varied as compared with the specific example of this invention above described. Thus the final cold drawing operation can be carried out at any temperature not higher than about 200° C., and the extent of the cold drawing can be varied. However, if the cold drawing is in excess of about 90%, the percent. conductivity is reduced excessively. While any substantial amount of cold drawing may be employed, it is ordinarily desirable to cold draw to afford at least 20% reduction in area after the low temperature anneal. Instead of cold drawing, any other cold mechanical working, as rolling, may be employed, so as to effect a reduction in area of the order above mentioned. The cold working of the alloy after the annealing step serves to develop the tensile strength. If the alloy is also subjected to substantial cold working prior to the annealing step, the conductivity of the alloy is not adversely effected by cold working sufficient to afford about 60% reduction in area after the low temperature anneal, which is surprising since cold working ordinarily decreases the conductivity of copper base alloys. When the cold working is in excess of about 60% reduction in area, the conductivity gradually decreases, and the decrease becomes excessive when, as mentioned above, the cold working affords more than 90% reduction in area. For obtaining the tensile strength and conductivity that are ordinarily the most satisfactory for commercial purposes, the cold working of the alloy after the low temperature annealing step is carried out, in preferred practice, so as to afford about 40% to about 80% reduction in area.

The low temperature annealing step is likewise important. When the copper, cadmium, iron alloy above described is subjected to the low temperature annealing step, a precipitation of alloying metal from solution is indicated by the increase that is afforded in conductivity of the alloy, although any such precipitate, if formed, is submicroscopic. When the iron and cadmium are in solution in the copper, the iron and cadmium, even though present in small amount, greatly reduce the conductivity of the alloy. When, however, the alloy is annealed at the proper temperature, the conductivity of the alloy is increased. The tensile strength of the alloy, on the other hand, is adversely affected by the anneal. The optimum temperature for the low temperature annealing step is about 450° C. to 500° C. The annealing step should be carried out at a temperature between about 375° C. and about 600° C., although better results are afforded if the annealing temperature is held between about 415° C. and about 535° C. The alloy should be kept at the annealing temperature for at least about three hours and preferably for four hours or more.

As mentioned above, it is preferably to subject the alloy to cold working as by drawing, rolling or the like, prior to the low temperature annealing step, due to the fact that the conductivity of the finished conductor is substantially increased by so doing. The cold working should be carried out at a temperature below about 200° C. and may afford any desired reduction in cross-section, although a reduction in cross-section of the order of 20% to 95% is ordinarily desirable and cold working to afford a reduction in area of the order of 30% to 75% is preferable.

Cold working of the alloy prior to the low temperature annealing step may, if desired, be carried out immediately after casting or other molding, particularly in the manufacture of strips or sheets. Thus the alloy may be cast while hot and then permitted to cool either rapidly or gradually to a temperature below about 200° C. that is appropriate for cold working. The alloy is then cold worked as by rolling. Usually it is desirable to employ at least two cold working steps with an intermediate annealing stop at a relatively high temperature appropriate for softening the alloy, e. g., at a temperature between about 500° C. and 900° C. so as to facilitate reduction of the alloy to desired dimensions by cold working. Thereafter the alloy is subjected to the low temperature anneal step followed by cold working as above described in order to develop the desired combined properties of high electrical conductivity and high tensile strength.

While superior properties of combined tensile strength and electrical conductivity can be attained by cold working the alloy prior to the low temperature annealing step, one can attain some of the advantages of this invention without carrying out the cold working step prior to such annealing. Thus, the alloy may merely be cast and hot worked prior to the low temperature annealing step and subsequent cold working, the annealing and subsequent cold working being carried out as above described. For example, if the alloy is cast, hot worked to 0.633 inch round, then annealed for 4½ hours at 460° C., and lastly cold drawn to afford a 50% reduction in area, the resulting product has a tensile strength of about 83,000 pounds per square inch and a conductivity of 59 per cent..

both values being inferior to those which can be attained when the alloy is cold worked prior to the annealing step. However, alloys can readily be produced in this manner which have an electrical conductivity of at least 55% and a tensile strength of at least 80,000 pounds per square inch. When the alloy is not cold worked prior to the annealing step, any amount of cold working after the annealing step adversely affects the conductivity of the alloy. This is in contrast with the behavior of the alloy when the alloy is cold worked prior to the annealing step, for, as mentioned above, the alloy when previously cold worked and then annealed may thereafter be cold worked to the extent of about 60% reduction in area without decreasing the conductivity of the alloy prior to the cold working step.

If the alloy is not cold worked prior to the low temperature annealing step, it is not necessary to cool the alloy prior to annealing. Thus the alloy may merely be cast and hot worked, and permitted to gradually cool so that the alloy will remain within the desired annealing temperature for from three or preferably four or more hours, namely, under conditions favorable to the development of the conductivity of the alloy.

The initial production of the formed alloy prior to the low temperature annealing and cold working steps or prior to the cold working, low temperature annealing and cold working steps, may be accomplished in any desired way. Ordinarily, and particularly in the case of round wires and the like, this may be accomplished by casting the alloy in the form of a billet and then subjecting the billet to hot rolling. Other hot working operations such as extrusion may also be employed. The hot working is ordinarily initiated when the alloy is at a temperature of the order of 800° C. to 850° C. and the alloy may cool considerably during the hot working operation, but usually not below about 550° C. Alternatively, as mentioned above, the alloy may be cast or otherwise molded while hot and thereafter formed by cold working prior to the low temperature annealing step. More generally, for initially forming the alloy prior to the low temperature annealing step mechanical working of the alloy may be employed at any temperature below about 900° C. By "mechanical working," any operation which results in change in the dimensions of the alloy mass such as are produced by rolling, drawing, extruding or the like is intended. During the initial mechanical working, the iron and cadmium remain entirely or partially in solution and the conductivity of the alloy is developed during the low temperature annealing step. If any of the mechanical working is carried out within the range of annealing temperatures above mentioned, the anneal will occur to the extent that the alloy is maintained at the annealing temperature during the mechanical working step.

It is preferable in the practice of this invention that the alloy consist entirely of iron, cadmium and copper in the proportions above given. This is the case because the presence of any other metal has the effect of reducing the conductivity of the alloy. However, small amounts of other metals may be tolerated, particularly those which tend to precipitate out during the annealing step. When it is stated that the new alloy consists essentially of iron, cadmium and copper constituting the balance, it is intended that the alloy be free from an amount of any metal or metals other than copper, iron and cadmium which reduces the conductivity of the finished alloy to less than 55 per cent.

It is apparent from the foregoing that, according to this invention, copper base alloys consisting essentially of iron, cadmium and copper are afforded which have high tensile strength and high electrical conductivity. Preferred alloys and electrical conductors composed thereof have a tensile strength of at least 90,000 pounds per square inch and a conductivity of at least 60%, although marked improvements are afforded when the tensile strength is at least 75,000 pounds per square inch and the electrical conductivity is at least 55%.

Various products and conductor members can be made from the new alloy, such as wires, rods, plates, strips, and the like.

While this invention has been described in connection with certain examples of the practice thereof, it is to be understood that this has been done merely for illustrative purposes, and that the scope of this invention is to be governed by the language of the following claims.

I claim:

1. An electric current conductor composed of copper base alloy, said alloy being an essentially non-precipitation hardenable alloy consisting essentially of 0.3% to 5% of iron, 0.4% to 1.2% of cadmium, and copper constituting the balance, the combined iron and cadmium being at least 1.5%, and said alloy having at least 55% conductivity and a tensile strength of at least 75,000 pounds per square inch.

2. An electric current conductor composed of copper base alloy, said alloy being an essentially non-precipitation hardenable alloy consisting essentially of 1.5% to 2.25% of iron, 0.8% to 1% of cadmium, and copper constituting the balance, and said alloy having at least 60% conductivity and a tensile strength of at least 90,000 pounds per square inch.

3. An alloy consisting of 0.3% to 5% of iron, 0.4% to 1.2% of cadmium, and copper constituting all of the balance, the combined iron and cadmium being at least 2%.

4. A method of producing an alloy having high tensile strength and high electrical conductivity which comprises making an essentially non-precipitation hardenable alloy consisting essentially of 0.3% to 5% of iron, 0.4% to 1.2% of cadmium, and copper constituting the balance by dissolving the iron and cadmium in the copper, subjecting the alloy to sustained heat at a temperature of the order of 375° C. to 600° C. for at least about 3 hours thereby effecting an increase in the electrical conductivity of the alloy without substantially increasing the tensile strength of the alloy, and thereafter subjecting the alloy to cold working at a temperature below about 200° C. to effect a reduction in area between about 20% and about 90% thereby increasing its tensile strength without excessively diminishing the increased electrical conductivity resulting from the aforesaid sustained heat treatment at a temperature of the order of 375° C. to 600° C.

5. In a method of producing an electrical conductor having high tensile strength and high conductivity, the steps comprising subjecting an essentially non-precipitation hardenable copper base alloy consisting essentially of 0.3% to 5% of iron, 0.4% to 1.2% of cadmium, and copper constituting the balance to cold working at a temperature below about 200° C. to accomplish at least about 20% reduction in area, then subjecting the alloy to a temperature of the order of 375° C. to 600° C. for at least about 3 hours to effect an increase in the electrical conductivity of the alloy accompanied by some softening of the alloy, and thereafter subjecting the alloy to substantial cold working below about 200° C. to afford at least about 20% but not greater than about 90% reduction in area.

6. The steps according to claim 5 wherein the last mentioned cold working step affords a reduction in area of the order of 40% to 80%.

7. A method of producing an alloy having high tensile strength and high electrical conductivity which comprises making an essentially non-precipitation hardenable alloy consisting essentially of 0.3% to 5.0% of iron, 0.4% to 1.2% of cadmium, and copper constituting the balance by dissolving the iron and cadmium in the copper, subjecting the alloy to a mechanical working carried on in the hot condition while the alloy is at a temperature between about 900° C. and about 550° C., subjecting the alloy to a cold working operation to afford at least about 20% reduction in area, then subjecting the alloy to sustained heat at a temperature of the order of 375° C. to 600° C. for at least 3 hours that effects an increase in the electrical conductivity of the alloy with only partial softening the alloy through only a partial recrystallization of the cold worked structure, and thereafter subjecting the alloy to substantial cold working at a temperature below about 200° C. to afford not greater than about 90% reduction.

ALAN MORRIS.

REFERENCES CITED

The following references are of record in the file of this patent:

UNITED STATES PATENTS

| Number | Name | Date |
|---|---|---|
| 1,778,668 | Fuller | Oct. 14, 1930 |
| 2,033,710 | Hensel et al. | Mar. 10, 1936 |
| 2,075,509 | Davis et al. | Mar. 30, 1937 |
| 2,126,827 | Smith | Aug. 16, 1938 |
| 2,145,792 | Hensel et al. | Jan. 31, 1939 |
| 2,155,407 | Crampton et al. | Apr. 25, 1939 |
| 2,169,188 | Kelly | Aug. 8, 1939 |
| 2,288,609 | Crampton et al. | July 7, 1942 |

OTHER REFERENCES

"Metals" by Carpenter and Robertson, published by the Oxford University Press, 1939, pages 1252 and 1253.

"Age Hardening of Metals" published by American Society for Metals, 1940, page 122.